United States Patent Office 3,314,644
Patented Apr. 18, 1967

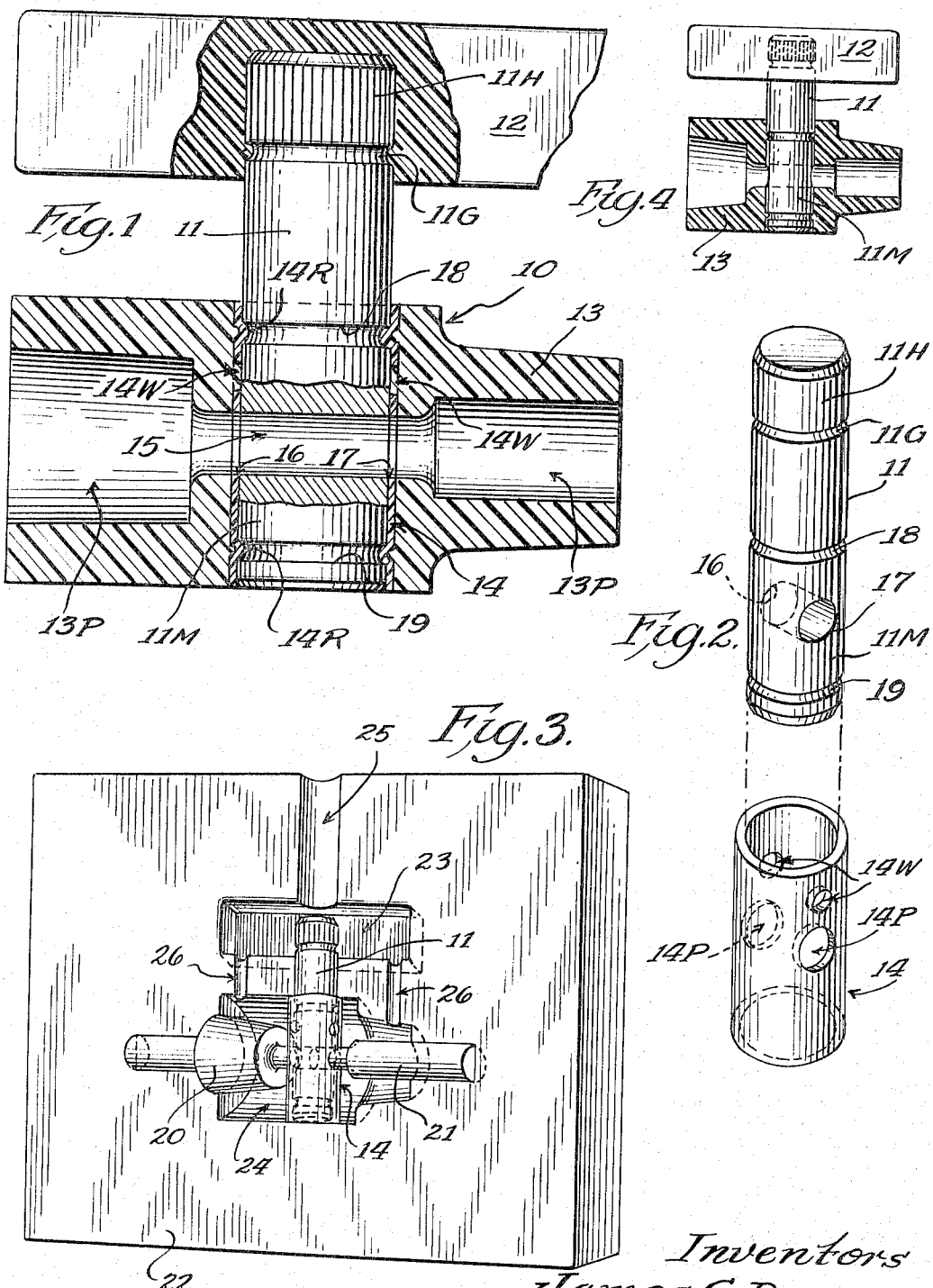

3,314,644
ROTARY FLOW CONTROL VALVE AND
METHOD OF MANUFACTURE
James G. Dwyer and John P. Locke, Michigan City, Ind., assignors to F. W. Dwyer Mfg. Co., a corporation of Illinois
Filed Apr. 21, 1964, Ser. No. 361,458
7 Claims. (Cl. 251—309)

This invention relates to flow control valves and more particularly is concerned with an integrated type of valve characterized by having a plastic valve body molded in retained position upon a ported cylindrical valve stem.

The principal object of the invention is the provision of such an integrated flow valve: to achieve economy of manufacture by eliminating need for subsequent machining; to achieve economy of manufacture by concurrently molding a handle and a valve body at spaced positions upon the stem; to effect a durable seal between a molded in place plastic valve body and a rigid valve stem by utilizing shrink action of the plastic thereby eliminating need for lubrication and gaskets; and to prevent accidental rotation such as might be induced by vibration while accommodating free valve adjustment.

Other and further objects of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIGURE 1 is an enlarged lengthwise sectional view through a rotary flow control valve of this invention;

FIGURE 2 is an exploded perspective view illustrating an assembly step in the manufacture of the valve of FIGURE 1;

FIGURE 3 is a perspective view illustrating the valve stem and core pin assembly positioned in the lower part of an injection mold die; and FIGURE 4 is a view of a completed valve representing an alternative embodiment of the invention.

Referring now to the drawings and particularly to FIGURE 1 there is illustrated generally at 10 a presently preferred embodiment of a two-way shut-off type rotary flow control valve. The valve 10 is comprised of a preformed rigid stem 11 having a plastic handle body 12 molded in place at one end 11H and having a plastic valve body 13 molded in retained position upon a cylindrical main length portion 11M of the stem.

In the embodiment of FIGURE 1, the valve body 13 includes means 14 integrated with such body and located in adjacent exterior surface contour conforming relation to the main length stem portion 11M to engage the same in anti-lengthwise relatively rotatable interlocking relation. The handle end 11H of the stem may be surface knurled as illustrated in FIGURE 1 and may be provided with an endless peripheral groove 11G for mechanical interlocking relation with the molded handle body 12. The main length portion 11M of the stem has its exterior surface polished to a highly smooth finish and it is provided with a through passage 15 which in the illustrated arrangement has a pair of transverse ports opening through its smooth finish and having port edges 16 and 17 rounded sufficiently to prevent galling of the surface against which it moves.

Finally, the stem 11 is shown provided with a pair of endles peripheral grooves 18 and 19 flanking the through passage 15 and each presenting oppositely axially directed annular faces adjacent the periphery of the stem surface to cooperate with the means 14 of the valve body 13 to engage in anti-lengthwise relatively rotatable interlocking relation therewith. While two such interlocking surface grooves are provided in the stem adjacent the valve body region, it should be noted that one will suffice as their function is primarily that of interlocking rather than sealing, the desired sealing being accomplished by the intimacy of contact that is established between the valve body and stem.

In the preferred practice of the invention, the means 14 consists of a sleeve of a lubric plastic material that is capable of limited cold flow and that has a right circular cylindrical form corresponding to that of the main length portion 11M of the stem. The sleeve 14 has its inside diameter matched to the outside diameter of the main length portion 11M of the stem to enable snug sliding application of the sleeve over the stem as a preliminary assembly operation which is illustrated in FIGURE 2. The sleeve has a separate transverse wall opening 14P corresponding to each transverse port of the stem passage and sized and spaced for matching registry therewith. In addition, the sleeve 14 has one or more smaller transverse wall openings 14W located to overlie a cylindrical surface region of the main portion 11M of the stem.

The main valve body 13 is of a molded plastic material having a significant shrink factor and it is impacted about the sleeve 14 and fills the additional wall openings 14W of the sleeve to effect a secure mechanical interlock that integrates the sleeve 14 and main valve body 13. The impacting and shrinking of the valve body directly in place upon the sleeve 14 forces the sleeve material to deform locally and enter the endless peripheral grooves 18 and 19 thereby presenting endless ribs 14R establishing the desired anti-lengthwise relatively rotatable interlocking relationship between the valve body and the valve stem. Thus, the valve body 13 comprises a solid mass except for a separated cored flow passage 13P corresponding to and communicating directly with each transverse port of the stem.

In the preferred practice of the present invention, the actual molding operation is carried out by means of conventional injection molding techniques and in accordance therewith the operating pressures are in excess of 10,000 p.s.i. and the operating temperatures of the mold material are on the order of 350° F. Accordingly, it is important that the techniques employed in the practice of this invention be compatible with these requirements. As mentioned previously, the stem is preformed so that no finishing operations are required upon the stem following the molding step. The stem may be of any material that is structurally rigid in the presence of the injection mold temperatures and pressure and, at present, stainless steel or brass are preferred, although glass and certain rubber compositions are also contemplated. After the stem is sized, bored and rough finished it may be tumbled to the requisite final finish, tumbling being preferred as it conveniently brings the exterior surface of the main length 11M of the stem to a smoothness of 8 microinch finish and concurrently rounds the port edges 16 and 17 to a radius of about .002 inch.

In particular, the sleeve 14 may be a tetrafluoroethylene resin such as is marketed under the trade name Teflon and, by way of example, may have a wall thickness of .015 inch. It, too, is preformed and, as illustrated in FIGURE 2, is applied over the preformed stem 11 immediately prior to the molding operation.

The sleeve is assembled upon the stem and accurate registry is established between the stem ports and the corresponding wall openings 14P of the sleeve. This assembly then is fitted with core pins 20 and 21 shaped to the contour which the valve body flow passages 13P are to have and these elements are positioned in a mold as illustrated in FIGURE 3 where only the lower part 22 of the mold is shown.

This lower mold part 22 has a cavity 23 to define the handle body 12 and a cavity 24 to define the valve body 13. An infeed groove 25 communicates with the handle cavity 23 and it in turn communicates with the valve body cavity 24 by means of a pair of flow channels 26.

It should be understood that the upper mold part is matched to that of the lower part and cooperates therewith in defining the final shape of the handle body 12 and of the valve body 13.

In the preferred practice of the invention, a moldable plastic having a shrink factor of .015 to .030 inch per inch is preferred. In particular, a thermoplastic acetal resin such as is marketed under the trade name Delrin 500 is preferred as it may be molded at a temperature of 350° F. and this affords an adequate margin of safety for the preformed Teflon sleeve 14. In addition, the mechanical properties of Delrin 500 are particularly suited for service as a valve body.

In the actual mold operation, the fluent mold material enters through the feed groove 25 and partially fills the handle cavity 23 and then flows into the valve body cavity 24 through passages 26 to impact directly against the sleeve 14 and form the sleeve into surface conforming encasing relation to substantially the entire length of the main portion 11M of the stem. This causes beads of the Teflon to enter the endless peripheral grooves 18 and 19 on the stem and establish the ribs 14R in mechanical interlocking relationship therewith. The shrink action of the mold material results in the establishment of an effective seal between the sleeve 14 and the main portion 11M of the stem and also between the main valve body 13 and the Teflon sleeve 14 and yet permits convenient manual manipulation of the finished valve unit without, however, contributing to undue accidental rotation such as might be caused by vibration.

Another embodiment of the invention is depicted in FIGURE 4 wherein the valve body 13 does not include a sleeve, but is impacted directly upon the exterior surface of the main length portion 11M of the stem. In this arrangement of FIGURE 4, this exterior stem surface may comprise the actual boundary of the material of the stem which is normally stainless steel or brass or it may consist of a surface coating of a lubric plastic material such as Teflon which is spray deposited upon this main length portion of the stem. In either instance, the stem surface and the port edges should conform to the smoothness and roundness requirements previously specified.

Thus, in the case of the valves of FIGURE 1 and FIGURE 4, an effective seal action is achieved by reason of the particulars of the stem surface smoothness and the shrink action of the plastic valve body which is impacted around it. Contrary to expectations, the rounded port edges 16 and 17 do not impair the effectiveness of the seal, but maintain its effectiveness by eliminating any galling such as would occur between the slidingly contacting surfaces that are brought into play during relative rotation of the valve parts. In the case of valves of 1/8 inch size, the operating torque for the valve construction shown in FIGURE 1 is 4 ounce-feet, whereas the operating torque for the valve shown in FIGURE 4 wherein the valve body material contacts a metal stem material is about 11 or 12 ounce-feet. The effectiveness of the sealing action is comparable in the valves of FIGURES 1 and 4.

At present, it is contemplated that valve structures in the size range of 1/8 inch, 1/4 inch and 3/8 inch may be manufactured with great improvement in economy by the practice of the present invention. Only a two-way shut-off type valve is illustrated herein in connection with the invention disclosure. It should be understood that three-way and four-way valves are also contemplated for manufacture in accordance with the present teachings and angle cock valves having a single transverse port and having an axial port may also be produced by this invention.

Thus, while preferred constructional features of the invention are embodied in the structure illustrated herein, it is to be understood that changes and variations may be made by those skilled in the art without departing from the spirit and scope of the appending claims.

What is claimed is:

1. A rotary flow control valve comprising a preformed stem that is structurally rigid in the presence of injection mold pressures said stem having a handle end with a handle thereon and a right circular cylindrical main stem portion provided with oppositely axially directed annular faces adjacent its periphery and provided with a through passage having inlet and outlet ports, said stem portion having a highly smooth exterior surface finish and having annular port edges rounded sufficiently to prevent galling, a sleeve of a lubric plastic material capable of limited cold flow in the presence of injection mold pressures and stable in the presence of 350° F. ambient temperature snugly enveloping said cylindrical portion, said sleeve being relatively rotatable interlocking relation with said cylindrical portion and having a transverse wall opening located for registry with each said port and having at least one additional transverse wall opening, and a valve body of molded plastic material impacted about said sleeve and filling said additional wall opening thereby to provide against relative movement between said valve body and sleeve and comprising a solid mass except for a separate cored flow passage corresponding to and communicating directly with each transverse port and a cored passageway conforming to the outer surface of said sleeve.

2. A rotary flow control valve in accordance with claim 1 in which said stem is made of metal and said valve body is made of thermoplastic acetal resin.

3. A rotary flow control valve comprising a preformed stem that is structurally rigid in the presence of injection mold pressures said stem having a handle end with a handle thereon and a right circular cylindrical main stem portion provided with a concentric endless surface groove and provided with a transverse throughbore having inlet and outlet ports, said stem portion having an exterior surface of about 8 microinch smoothness and having annular port edges rounded to a radius of about .022 inch; a sleeve of lubric plastic material capable of limited cold flow in the presence of injection mold pressures and stable in the presence of 350° F. ambient temperature and having a right circular cylindrical form having an inside diameter matched to the outside diameter of said stem portion to enable snug sliding application of said sleeve over said stem portion, said sleeve having surface conforming encasing relation to substantially the entire length of said cylindrical portion and engaging an antilengthwise relatively rotatable interlocking relation with said groove and having transverse wall openings located for registry with said ports and having at least one additional transverse wall opening, a valve body of molded plastic material having a shrink factor of about .020" impacted about said sleeve and filling said additional wall opening to provide against relative movement between said sleeve and valve body, said valve body comprising a solid mass except for cored inlet and outlet passages that communicate directly with corresponding ones of said transverse ports and a cored passageway conforming to the outer surface of said sleeve.

4. A method of making a rotary flow control valve comprising preforming a stem to provide an end portion and to provide a main stem portion that presents an exterior surface of right circular cylindrical form and of about 8 microinch smoothness and that presents a throughpassage having more than one transverse port opening through said surface, inserting a removable core pin in each transverse port and concurrently injection molding a plastic material about said end portion to provide a handle body mechanically interlocked therewith and about said main portion to impact said material in exterior surface contour conforming relation to said main portion to provide a valve body and locking said body in anti-lengthwise relatively rotatable interlocking relation to said main stem portion.

5. A method of making a rotary flow control valve comprising pre-forming a rotatable element having a smooth round-surfaced main portion and a handle end, said main portion having a through transverse passage connected to ports at the surface of said main portion, inserting removable core pins in said ports, placing said rotatable element with said core pins in a mold having a cavity shaped to a desired valve body and valve handle, concurrently injection molding a plastic material about said handle end to provide a handle mechanically interlocked therewith and about said main portion to impact said material in exterior surface contour-forming relation to said main portion to provide a valve body and locking said body in anti-lengthwise relatively rotatable interlocking relation to said main portion.

6. A method in accordance with claim 5 in which the rotatable element is made of metal and said main portion is snugly enveloped with lubric plastic material, having transverse wall openings coincident with said ports and locked against lengthwise movement relative to said main portion, prior to inserting said core pins.

7. A method in accordance with claim 6 in which said lubric plastic material has at least one additional transverse wall opening in addition to those coincident with the ports and said plastic material is concurrently injected into said additional opening thereby locking the body to said lubric plastic material against relative movement.

References Cited by the Examiner

UNITED STATES PATENTS

| 20,395 | 5/1858 | Wood | 29—157.1 |
| 2,387,013 | 10/1945 | Fuller | 29—157.1 |
| 2,854,027 | 9/1956 | Kaiser et al. | 251—310 X |
| 3,044,493 | 7/1962 | Welty et al. | 137—625.32 |
| 3,199,835 | 8/1965 | Freed | 251—309 |
| 3,210,042 | 10/1965 | Freeman | 251—309 X |
| 3,223,111 | 12/1965 | Anderson | 251—315 X |

FOREIGN PATENTS

| 1,327,745 | 4/1963 | France. |
| 690,367 | 4/1953 | Great Britain. |

M. CARY NELSON, *Primary Examiner.*

HENRY T. KLINKSIEK, *Examiner.*